(12) United States Patent
Burns et al.

(10) Patent No.: US 8,212,920 B2
(45) Date of Patent: Jul. 3, 2012

(54) APPARATUS AND METHOD OF MOTION ADAPTIVE IMAGE PROCESSING

(75) Inventors: James Edward Burns, Basingstoke (GB); Karl James Sharman, Eastleigh (GB); Nicholas Ian Saunders, Basingstoke (GB); Robert Mark Stefan Porter, Winchester (GB)

(73) Assignee: Sony United Kingdom Limited, Weybridge (GB)

( * ) Notice: Subject to any disclaimer, the term of this patent is extended or adjusted under 35 U.S.C. 154(b) by 1246 days.

(21) Appl. No.: 11/949,300

(22) Filed: Dec. 3, 2007

(65) Prior Publication Data

US 2008/0136965 A1    Jun. 12, 2008

(30) Foreign Application Priority Data

Dec. 6, 2006   (GB) .................................. 0624400.8

(51) Int. Cl.
    *H04N 11/20* (2006.01)
(52) U.S. Cl. ..................... 348/452; 348/446; 348/451
(58) Field of Classification Search .............. 348/446, 348/448, 452, 699, 700, 451, 208.4, 208.5, 348/208.6, 208.13
    See application file for complete search history.

(56) References Cited

U.S. PATENT DOCUMENTS

| | | | | |
|---|---|---|---|---|
| 4,992,869 A | * | 2/1991 | Samad et al. | 348/451 |
| 5,089,887 A | * | 2/1992 | Robert et al. | 348/699 |
| 5,093,720 A | * | 3/1992 | Krause et al. | 348/452 |
| 5,301,019 A | * | 4/1994 | Citta | 375/240.16 |
| 5,510,856 A | * | 4/1996 | Jung | 348/699 |
| 5,631,706 A | * | 5/1997 | Tsunashima | 348/452 |
| 5,715,006 A | * | 2/1998 | Yokoyama | 348/416.1 |
| 6,304,602 B1 | * | 10/2001 | Yokoyama | 375/240.08 |
| 2005/0078751 A1 | * | 4/2005 | Ghanbari et al. | 375/240.16 |

FOREIGN PATENT DOCUMENTS

| | | |
|---|---|---|
| JP | 64-54986 | 3/1989 |
| WO | WO 2004/039074 A1 | 5/2004 |

* cited by examiner

*Primary Examiner* — Pankaj Kumar
*Assistant Examiner* — Timothy Newlin
(74) *Attorney, Agent, or Firm* — Oblon, Spivak, McClelland, Maier & Neustadt, L.L.P.

(57) ABSTRACT

A method of image processing for conversion of an image in a sequence of images comprises the steps of associating pixels of an image with respective motion values indicative of a degree of inter-image motion for each pixel; adjusting the motion value of each pixel based upon the motion value of a secondary pixel found within a first region of a first predetermined size substantially centered upon each respective pixel, said secondary pixel being that whose associated motion value is indicative of the greatest motion of any pixel in the first region; adjusting the motion value of each pixel based upon the motion value of a secondary pixel that lies within a second region of a second predetermined size substantially centered upon each respective pixel, said secondary pixel being that whose associated motion value is indicative of the least motion of any pixel in the second region; categorizing each pixel as a static pixel or a motion pixel according to its respective associated motion value, and then selecting respectively either a first conversion process or a second conversion process for a pixel dependant upon whether that pixel is categorized as a static pixel or a motion pixel.

9 Claims, 14 Drawing Sheets

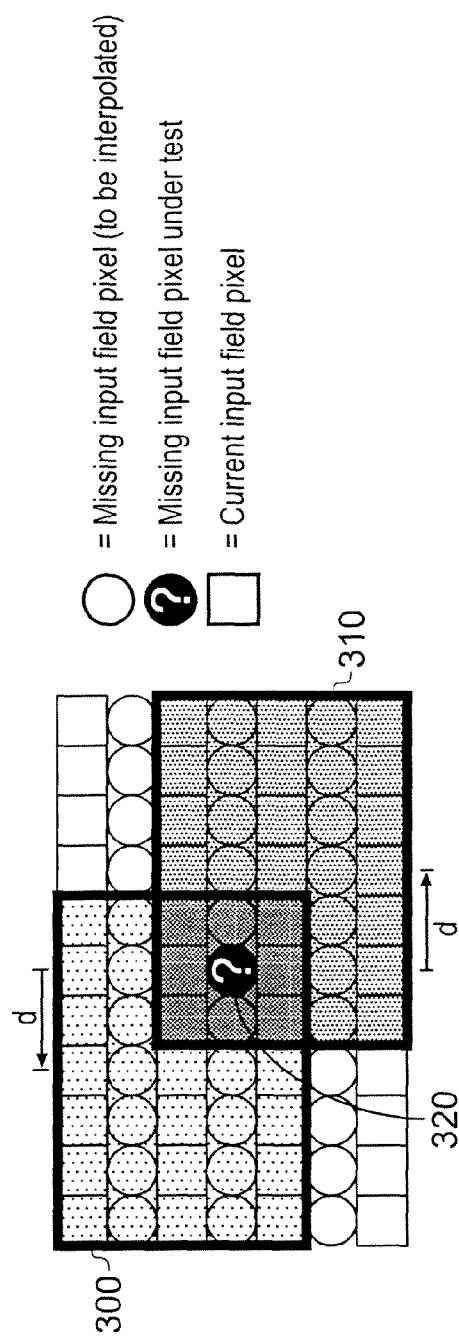
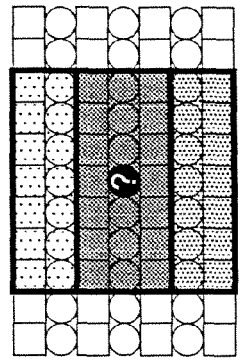
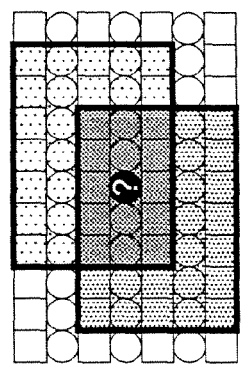
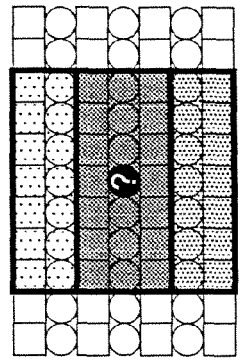
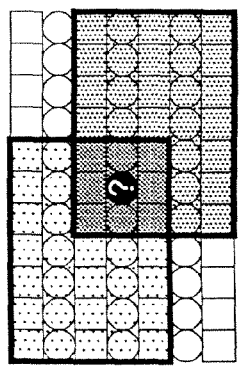
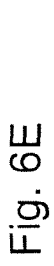

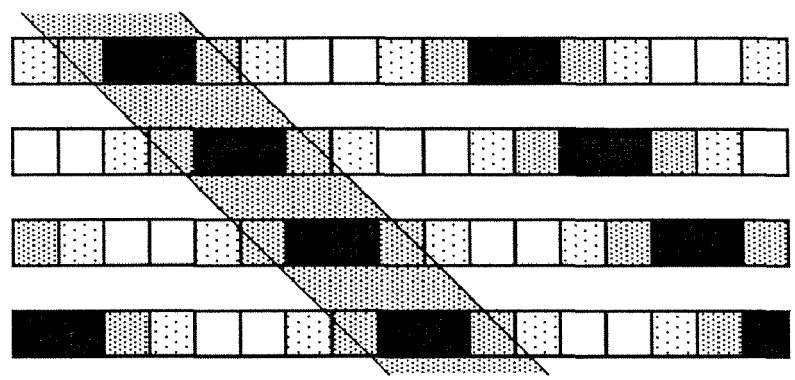
Fig. 8A
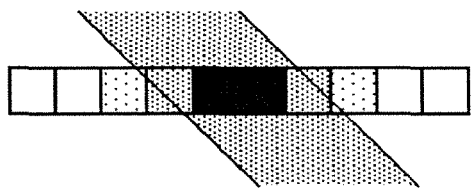
Fig. 8B
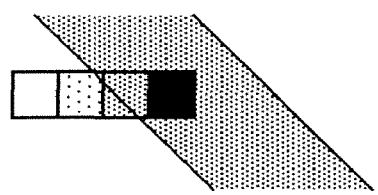   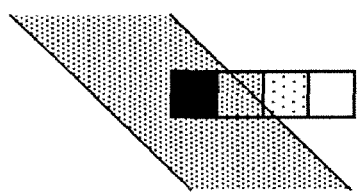
Fig. 8C                Fig. 8D

APPARATUS AND METHOD OF MOTION ADAPTIVE IMAGE PROCESSING

BACKGROUND OF THE INVENTION

1. Field of the Invention

This invention relates to motion adaptive image processing.

2. Description of the Prior Art

Video image capture represents a spatial and temporal sampling process. An image is captured as a set of pixels arranged in rows or lines. Successive images are captured at spaced instants in time.

A complication is the common use of interlaced video capture and processing. In an interlaced video signal, each image is handled as two sets or fields of alternate lines of pixels. For example, odd numbered lines might be included in one field, whereas even numbered lines could be included in the next field. An advantage of interlaced techniques is that they give an apparent doubling of the image rate, so reducing flicker effects, for no substantial increase in video signal bandwidth.

All of these aspects of sampling can give rise to alias effects if an attempt is made to capture or process video material having spatial or temporal frequencies which are too high for the respective sampling rate. But a particular alias problem will be described here in the area of interlace to progressive scan video conversion.

If it is desired to convert between interlaced video and progressive scan (non-interlaced) video, then for non-moving images it is merely necessary to interleave two successive fields to recreate a non-interlaced frame having all lines of pixels present. However, if there is any significant inter-field motion, this approach may not work. In such circumstances it can be more appropriate to derive the lines of pixels which are missing in one field from other pixels in that same field. In other words an intra-field interpolation process is used.

In practice, a video source may comprise image sequences in which some regions represent moving images whilst some regions do not. For example, when a newscaster speaks to a fixed camera, the newscaster's mouth, face, and head may move considerably, whilst their torso, the desk and the wall behind them do not.

Therefore the different conversion strategies noted above may be appropriate within different regions of the same image. It is therefore important to determine which strategy to use for a given pixel.

Interpolation will generally give a worse result than interleaving for non-moving portions, whereas interleaving and will generally give a worse result than interpolation for moving portions. So, the choice of the more appropriate technique is very important.

Notably, the presence of noise within the video signal can affect such determinations. It may be readily appreciated that noise can cause apparent differences between successive fields that may be erroneously interpreted as motion, but it is also true that noise can serve to counteract genuine changes due to motion, resulting in a pixel or region of pixels erroneously appearing to be static. Such noise-induced static misclassification results in different interpolation strategies being used that give different output results in the converted image, thereby exacerbating the effect of the noise in the image.

It would therefore be desirable to reduce the impact of the noise-induced misclassification of pixels as representing static image regions.

It is an object of the present invention to seek to mitigate or alleviate the above problem.

SUMMARY OF THE INVENTION

In one aspect of the present invention, a method of image processing for conversion of an image in a sequence of images comprises the steps of: associating each respective pixel of an image or a part of the image with a respective motion value indicative of a degree of inter-image motion for that pixel; adjusting the motion value of each respective pixel based upon the motion value of a secondary pixel found within a first region of a first predetermined size substantially centred upon each said respective pixel, said secondary pixel being that pixel whose associated motion value is indicative of the greatest motion of any pixel in the first region; and then adjusting the motion value of each respective pixel based upon the motion value of a secondary pixel that lies within a second region of a second predetermined size substantially centred upon each said respective pixel, said secondary pixel being that pixel whose associated motion value is indicative of the least motion of any pixel in the second region; and then selecting contributions from a first conversion process and/or a second conversion process for each respective pixel dependant upon its respective associated adjusted motion value.

In another aspect of the present invention, image processing apparatus for conversion of an image in a sequence of images comprises: a motion detector to associate each respective pixel of an image or a part of the image with a respective motion value indicative of a degree of inter-image motion for that pixel; a first motion value adjuster operable to adjust the motion value of each respective pixel based upon the motion value of a secondary pixel found within a first region of a first predetermined size substantially centred upon each said respective pixel, said secondary pixel being that pixel whose associated motion value is indicative of the greatest motion of any pixel in the first region; a second motion value adjuster operable to adjust the motion value of each respective pixel based upon the motion value of a secondary pixel that lies within a second region of a second predetermined size substantially centred upon each said respective pixel, said secondary pixel being that pixel whose associated motion value is indicative of the least motion of any pixel in the second region; and a conversion selector operable to select contributions from a first conversion process and/or a second conversion process for each respective pixel dependant upon its respective associated adjusted motion value.

Advantageously, the above two aspects therefore have the effect of firstly expanding motion regions to a first extent, and then expanding the static regions to a second, typically smaller extent (equivalent to shrinking the motion regions). However, isolated static regions that are smaller in radius than the first predetermined distance are completely removed by the motion expansion, and so are not able to recover during the subsequent static expansion. Meanwhile, other static regions recover to approximately their original state. The final result is that small, isolated static regions are removed whilst other static regions are substantially unchanged.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIGS. 5 and 6a to 6e schematically illustrate a spatial block matching operation;

FIGS. 8a to 8d schematically illustrate alias detection techniques;

DESCRIPTION OF THE PREFERRED EMBODIMENTS

Figure 1:
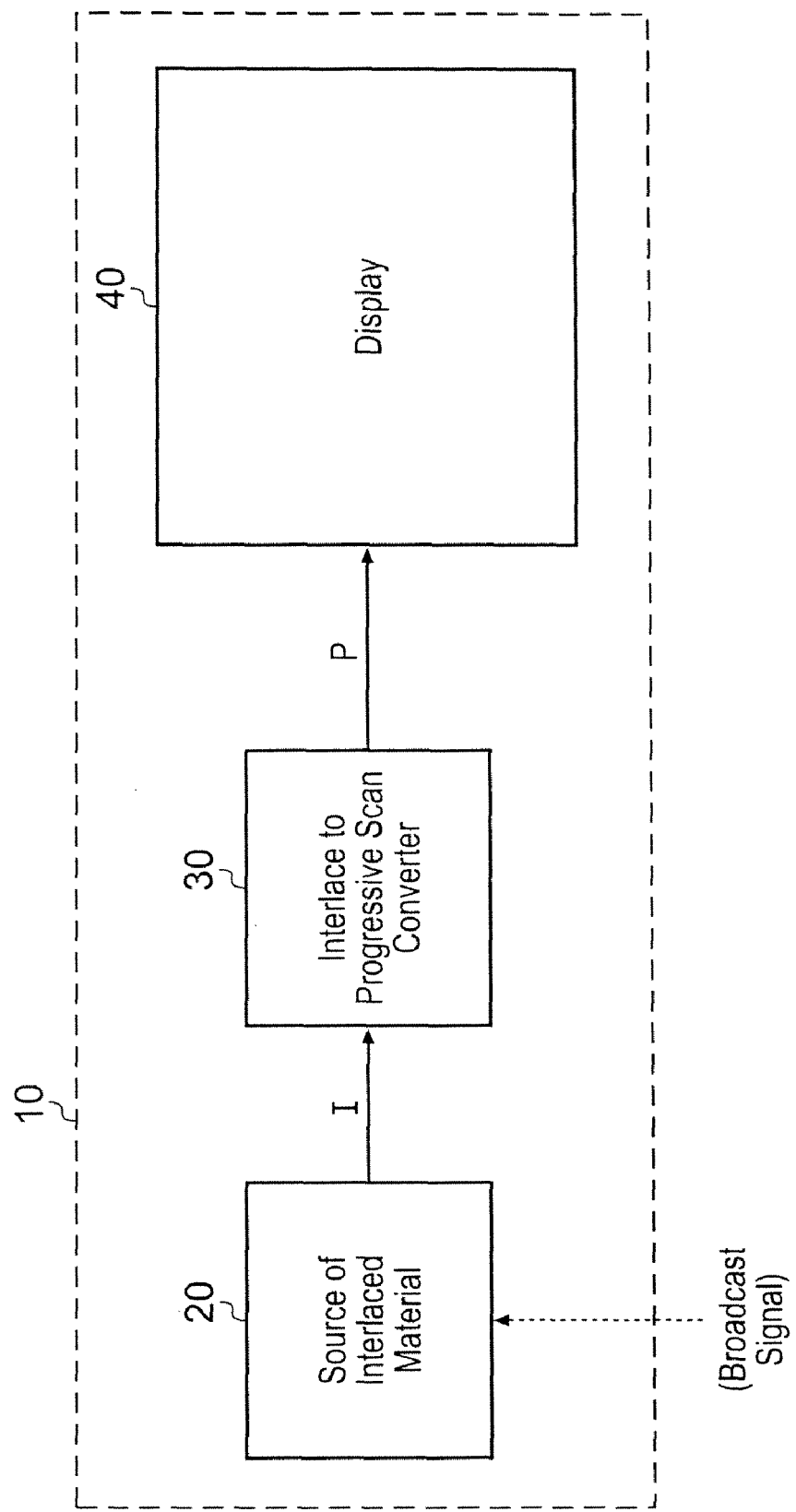
FIG. 1 schematically illustrates a flat-screen display arrangement.

FIG. 1 schematically illustrates a flat screen display arrangement 10 comprising a source of interlaced video material 20, an interlace to progressive scan converter 30 and a display panel 40 such as a liquid crystal (LCD) or plasma display. This illustrates a typical use of interlace to progressive scan conversion, in that many broadcast signals are in the interlaced format whereas many flat panel displays operate most successfully in a progressive scan format. Accordingly, in FIG. 1, a broadcast signal received by the source of interlaced material 20 is used to generate an interlaced signal for display. This is passed to the interlace to progressive scan converter 30 to generate a progressive scan signal from the interlaced signal. It is the progressive scan signal which is passed to the display 40.

It will be appreciated that the source of interlaced material 20 need not be a broadcast receiver, but could be a video replay apparatus such as a DVD player, a network connection such as an internet connection and so on.

Figure 2:
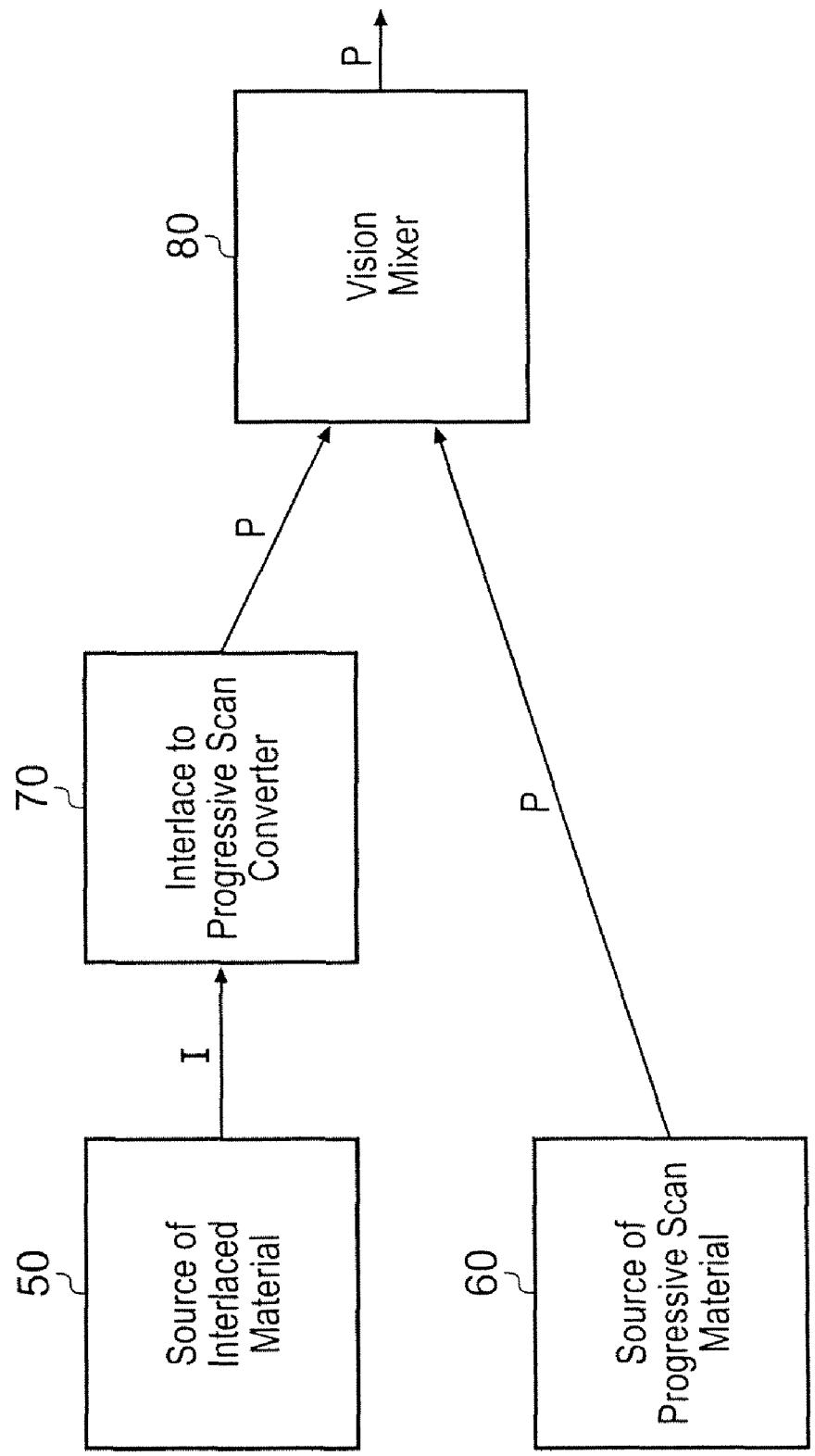
FIG. 2 schematically illustrates video mixing operation in a studio environment.

FIG. 2 schematically illustrates a video mixing operation in a studio environment, in order to give another example of the use of interlace to progressive scan conversion. Here, a source of interlaced material 50 and source of progressive scan material 60 are provided. These sources could be cameras, video replay apparatus such as video tape recorders or hard disk recorders, broadcast receivers or the like.

The interlaced output from the source of interlaced material 50 is supplied to an interlace to progress scan converter 70 to generate a progressive scan signal. This can be processed by the vision mixer 80 along with the progressive scan material from the source 60 to generate a processed progressive scan output. Of course, the progressive scan output of the vision mixer 80 can be converted back to an interlaced format if required, e.g. for subsequent broadcast or recording. It will also be appreciated that the vision mixer 80 is just one example of video processing apparatus; instead, a digital video effects unit, for example, could be used at this position in FIG. 2.

Figure 3:
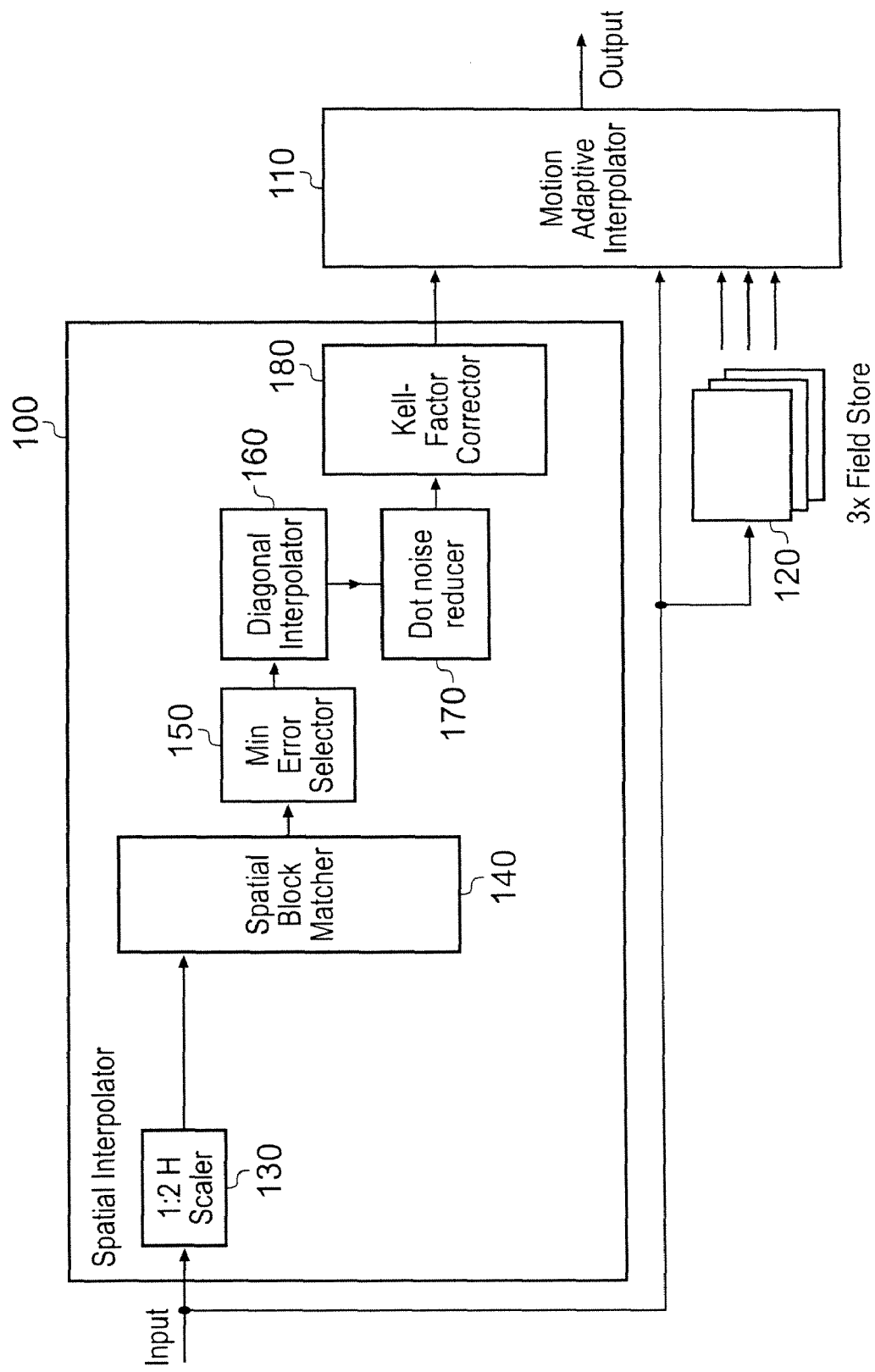
FIG. 3 schematically illustrates an interlace to progressive converter.

FIG. 3 schematically shows an interlace to progressive scan converter. In general terms, the converter comprises an intra-field interpolator such as a spatial interpolator 100, a motion adaptive interpolator 110 and a set of three field stores 120.

The converter of FIG. 3 operates to generate output progressive scan frames at the same repetition frequency as the input interlaced fields. Therefore, a main requirement of the converter is to generate the "missing" pixels in each interlaced field to turn that interlaced field into a progressive scan frame. This can be achieved in one of two ways. On one hand, the spatial interpolator 100 generates the "missing" pixels by spatial interpolation within the field concerned. In other words, this is an intra-field operation. On the other hand, the motion adaptive interpolator generates the missing pixels by inserting pixels from an adjacent field of the opposite polarity. This is valid only if there is no image motion between the fields, so the basic organisation of FIG. 3 is that the output of the spatial interpolator 100 is used at image positions where image motion is detected, while the output of the motion adaptive interpolator 110 is used at pixel positions where image motion is not detected. For simplicity of operation, the spatial interpolator operates at each pixel position, and the motion adaptive interpolator either selects the output of the spatial interpolator, or selects a pixel from another field of the opposite polarity for output, or mixes the two.

The motion adaptive interpolator will be described in more detail below. First, the spatial interpolator will be briefly described.

The spatial interpolator comprises a 1:2 horizontal pixel scaler 130, a spatial block matcher 140, a minimum error selector 150, a diagonal interpolator 160, a dot noise reducer 170 and a Kell-factor corrector 180. The operation of each of these is summarised below.

The scaler 130 uses horizontal linear interpolation to generate one additional pixel value between each two pixels of the input interlaced field (i.e. a 1:2 scaling operation). So, the horizontal resolution (at least in terms of number of available pixel values) is doubled, but no difference is made at this stage to the vertical resolution.

The overall operation of the spatial block matcher 140 and the diagonal interpolator 160 is to detect the orientation of an image feature relevant to a pixel position where a new pixel is to be interpolated, and then to apply an interpolation along that image feature direction. So, if a current pixel position to be interpolated lies within a diagonal image feature (a line, an edge etc.) at, say, 45° to the horizontal, interpolation of that new pixel would take place along that 45° direction. This can tend to give a better output result than restricting the interpolation to horizontal or vertical interpolation. A key part of this process, clearly, is therefore to detect the direction of an image feature at each pixel position.

Figures 4A, 4B, 4C:
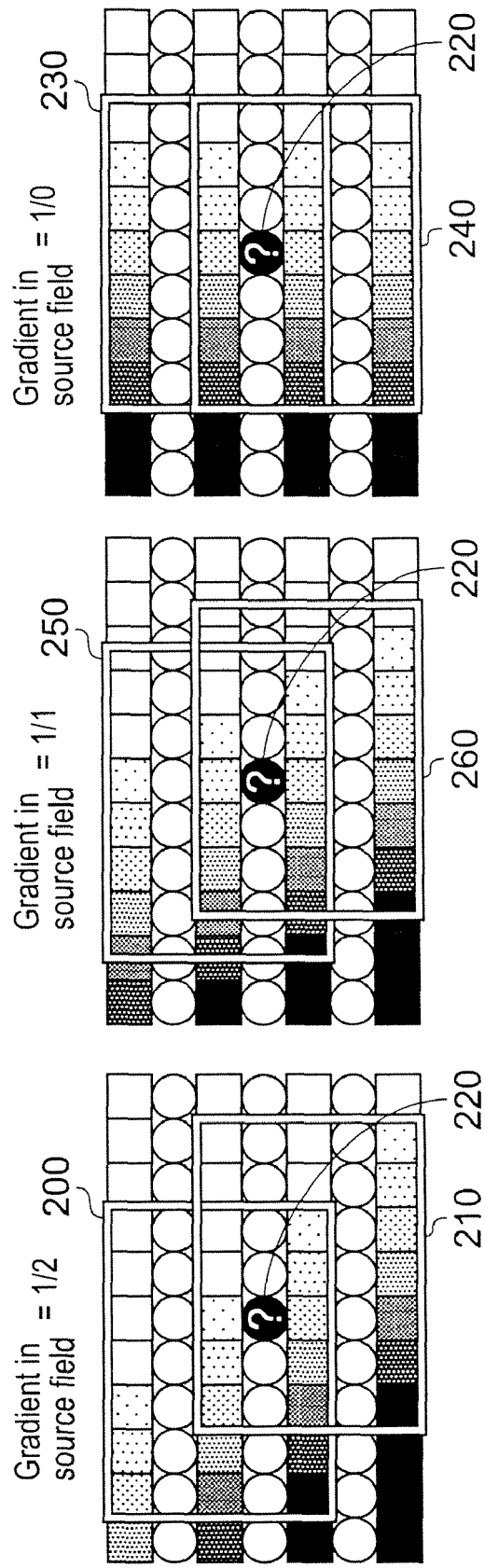
FIGS. 4a to 4c schematically illustrate gradient detection.

Referring now to FIGS. 4A-4C, this detection is carried out using a block matching process. FIG. 4A schematically illustrates a successful block match between two blocks 200, 210 of pixels around the position of an unknown pixel 220 (a circle with a question mark inside). Indeed, the notation used in the present drawings is that a square indicates a known pixel whereas a circle indicates a pixel to be interpolated by the diagonal interpolator 160. The shading in FIGS. 4A to 4C is a schematic representation of an image feature.

So, referring to FIG. 4A, a successful block match is obtained between the blocks 200, 210 around the unknown pixel position 220, indicating a gradient of an image feature of 1/2.

Turning now to FIG. 4C, an image feature is vertical and there is again a successful block match between overlapping blocks 230, 240.

However, in FIG. 4B, the image feature has a gradient of 1/1. It is not possible to obtain a successful block match with the blocks at integral pixel positions. A successful match between blocks 250, 260 occurs at a half integral pixel position. Accordingly, in order to detect gradients of this nature (indeed any gradients sharper than 1/2), it is necessary to operate at a sub-pixel accuracy. In the present case, a half-pixel accuracy was adopted, by using pixels from the 1:2 scaler. If a greater accuracy still was used, (e.g. quarter-pixel accuracy) then gradients yet closer to vertical could be detected.

FIGS. 5 and 6A to 6E schematically illustrate the spatial block matching operation.

As noted above, spatial block matching is carried out at sub-pixel accuracy; in this case half-pixel accuracy.

A range of block sizes is used, with corresponding search ranges (maximum displacements relative to the pixel position under test). Taking into account the 1:2 scaling operation, example block sizes and search ranges are given in the following table:

| Block Size (in scaled pixels) | Search Range (in scaled pixels) |
|---|---|
| 3v × 5h | 0h |
| 3v × 5h | ±1h |
| 3v × 7h | ±2h |
| ... | ... |
| 3v × 41h | ±19h |

FIG. 5 schematically illustrates a block match operation between two blocks of 3 v (vertical)×7 h (horizontal) pixels 300, 310, around an unknown pixel position 320. The variable d signifies a horizontal displacement of the block's horizontal centre from the pixel position under test. A condition applied to the block matches is that the blocks must always overlap the pixel position under test. Also, the blocks are shown displaced in integral numbers of real pixel displacements (so a displacement of m corresponds to a displacement of 2 m interpolated pixels). Accordingly, the particular block size shown in FIG. 5 allows nine possible tests including at a displacement of −2 pixels (FIG. 6A) −1 pixel (FIG. 6B), 0 pixels (FIG. 6C), +1 pixel (FIG. 6D), and +2 pixels (FIG. 6E).

Note that the displacement is indicated as a displacement from the centre. The two blocks are displaced by equal amounts, though in opposite directions. Symmetrical displacements are used because otherwise the block matching could detect lines or edges which are not relevant to the pixel under test.

A sum of absolute differences (SAD) is calculated for each block match. This is defined as:

$$SAD(x, y, d, n) = \sum_{dx=-n}^{n} \sum_{dy=-3,-1,1} \sum_{RGB/YCbCr} |p(x-d+dx, y+dy) - p(x+d+dx, y+dy+2)|$$

where x, y represent the current pixel co-ordinate (y being a frame line number), d is the displacement being tested, and n is the "radius" of the block (the block width is n'=2n+1).

In general terms, the SAD values for three colour components (red, green and blue) are combined, and a minimum normalised SAD value determines a gradient for interpolation. Various checks are made to avoid poor interpolation, as described below.

Figure 7A:
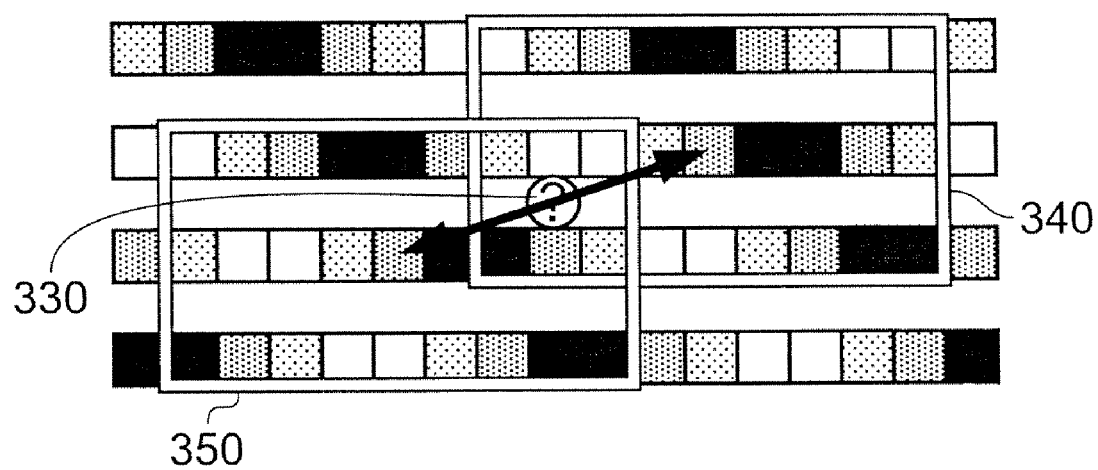
FIGS. 7a and 7b schematically illustrate an alias situation.
Figure 7B:
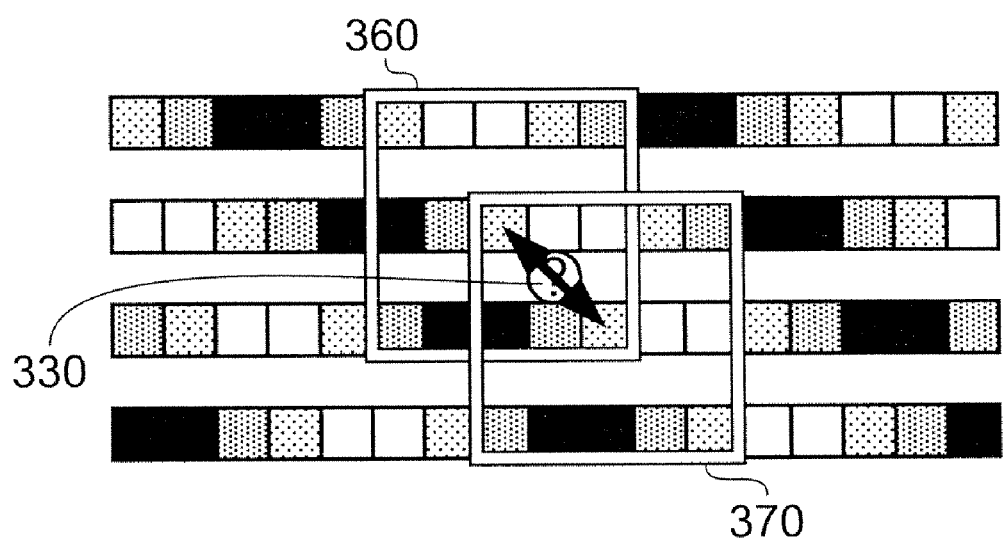

Measures are taken to avoid problems caused by alias situations. FIGS. 7A and 7B illustrate a possible alias situation.

Referring to FIG. 7A, a block match between blocks 340 and 350 suggests that an unknown pixel 330 should be a dark grey colour. Here, the block match is 100% successful and so the SAD value would be zero (note that this is a schematic example!)

However, in FIG. 7B, a block match between blocks 360 and 370 is also 100% successful, again giving a SAD value of zero. The block match of FIG. 7B suggests that the unknown pixel 330 should be a light grey colour.

This conflict of block match results is a product of aliasing between the closely spaced diagonal image features in the image portions shown in FIGS. 7A and 7B. While it may at first appear that either diagonal line is equally valid (i.e. a steep diagonal line from upper left to lower right or a more gentle diagonal line from upper right to lower left), a processing rule has been set up to allow an appropriate selection to be made.

The basis of the rule is that the block match process is restricted so that only areas considered to be "line segments" are detected. That is to say, each block in a block match should contain a line segment.

A digitised line segment is considered to have two properties. Firstly, it is monotonic along the central scan line row of the block in question, and secondly there is a vertical transition between scan lines in the block in question. The way in which these properties may be tested will be described with reference to FIGS. 8A to 8D.

In FIG. 8A, a source field contains multiple diagonal lines. FIG. 8B schematically illustrates one row of pixels within the image of FIG. 8A. FIGS. 8C and 8D illustrate the two edges of the diagonal line shown in FIG. 8B. It will be seen that each of these edges has a region of pixels which show a monotonic variation in luminance. Also, referring back to FIG. 8A, it can be seen that such segments exhibit a vertical transition between adjacent rows of pixels.

So, turning back to FIGS. 7A and 7B, the block match of FIG. 7A would be rejected in favour of the block match of FIG. 7B according to the rule described above. This is because the central line of pixels of the two blocks of FIG. 7B shows a monotonic variation in luminance, whereas the centre line of pixels of the blocks 340, 350 in FIG. 7A does not.

The tests are performed separately in respect of each of the colour components (e.g. R, G and B). All three tests must be passed separately. Alternatively, for example to save hardware, fewer than three tests could be performed. For example, only the luminance, or only one colour component, might be tested. Of course, a YCbCr or YPbPr representation could be tested instead.

The diagonal interpolator 160 is a simple pixel averager: given a direction it picks the pixel in that direction on the line below and the pixel in that direction on the line above and averages them.

The dot noise reducer 170 involves a process which is applied to the output of the diagonal interpolator 160. A test is applied to detect whether an interpolated pixel lies within the maximum and minimum values of four neighbouring vertical and horizontal pixels, i.e. the pixels immediately above, below, left and right of the interpolated pixel. Note that the pixels above and below the interpolated pixel will be real pixels, whereas those to the left and right will be interpolated themselves.

If the interpolated pixel does not lie within this range, then;

Let v be the original value of the pixel under consideration, and let v' be v, clipped to lie within the range of the four locally neighbouring pixels.

Let the new pixel value be kDNR v'+(1−kDNR)v, where kDNR is a programmable constant.

The operation of the Kell-factor corrector 180 will now be described.

In the present discussion, references to the Kell-factor are simply to help explain the operation of this part of an exemplary system. What the filter is actually exploiting is simply the knowledge that the source image did not use the full bandwidth available to it, whether that is because of scanning artefacts or because of a low pass filtering process.

The Kell-factor is a quantity which represents a property of progressive scan and interlaced images. In order to represent the information being scanned, it is generally considered that only 70% (the Kell-factor) of the possible vertical bandwidth is (or should be) represented. Hence when performing an interlace to progressive scan conversion, it is potentially hazardous to attempt to produce a full vertical bandwidth image. Instead, a compensation to account for a Kell-factor of less than unity may be used.

One method to compensate for the Kell-factor would be to use a 70% bandwidth filter on the frame output of any interlace to progressive scan algorithm. However, one of the fields in the frame is 'real' data—i.e. it was sampled correctly, so the content arising from that field must by definition be perfect. Thus a method to filter just the interpolated lines is used.

Figure 9A:
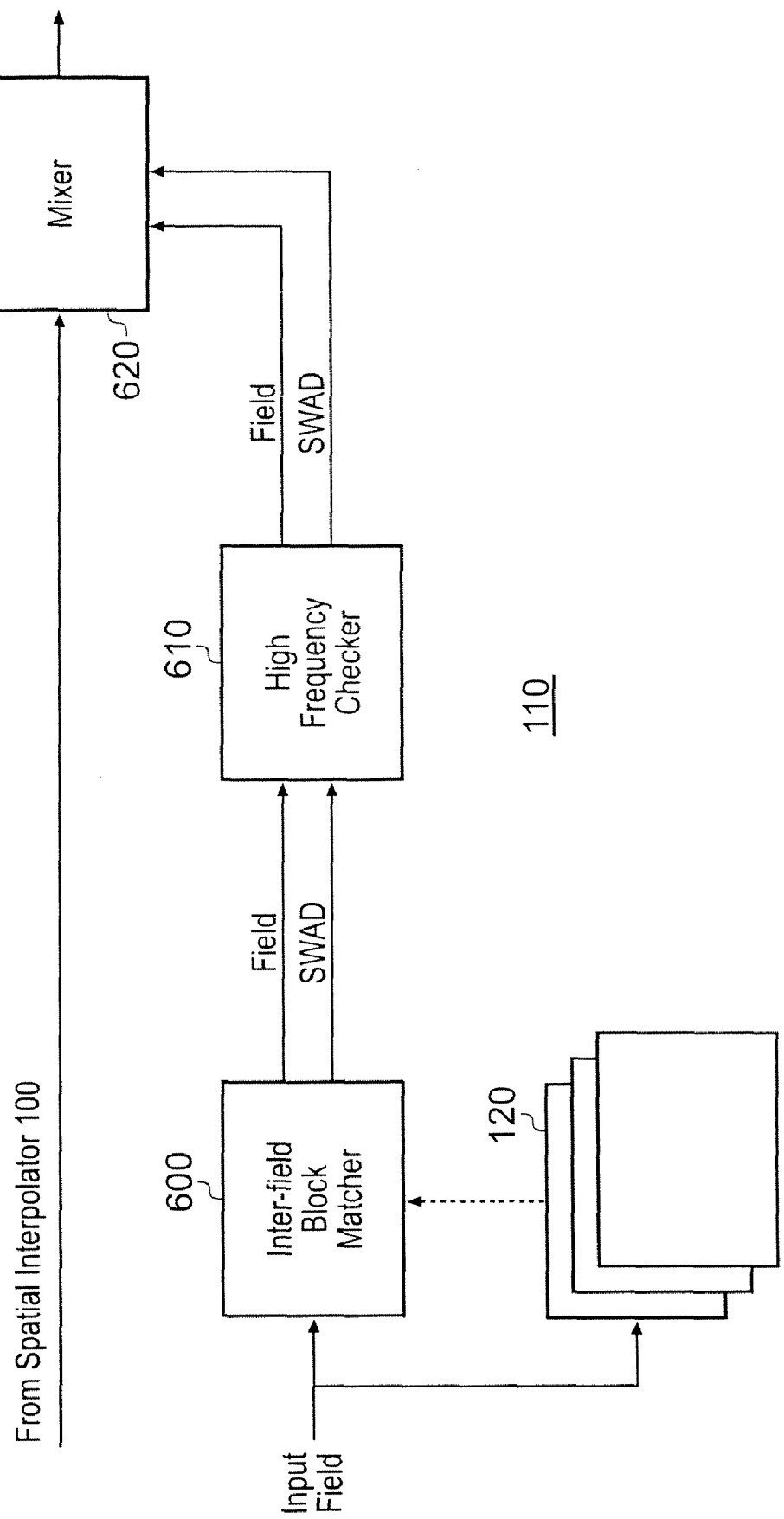
FIG. 9a schematically illustrates a motion adaptive interpolator.

FIG. 9a schematically illustrates the operation of the motion adaptive interpolator 110. The interpolator 110 comprises and inter-field block matcher 600, an optional high frequency checker 610 and a mixer 620.

Figure 9B:
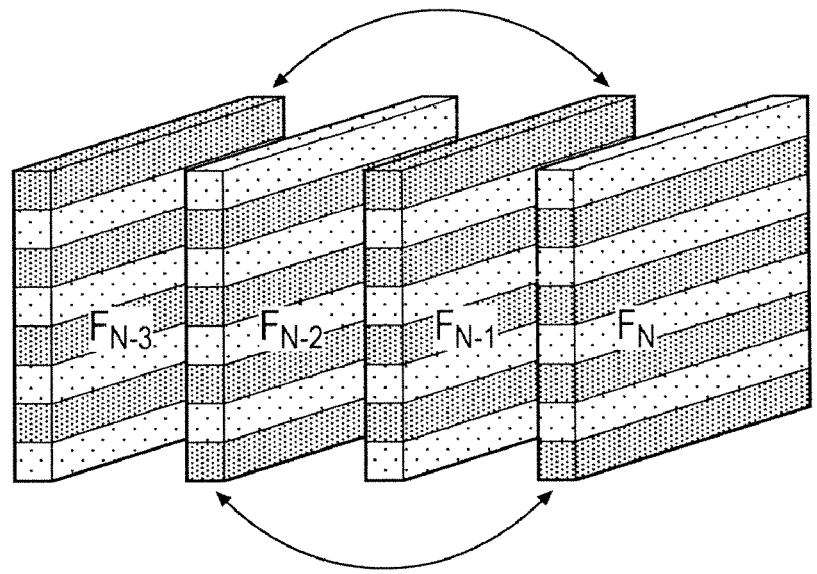
FIG. 9b schematically illustrates motion detection between successive video fields.

The inter-field block matcher 600 uses data from the current input field and the three field stores 120 to carry out inter-field motion comparisons. This involves comparing blocks of pixels the current field ($F_N$ in FIG. 9b) with correspondingly positioned blocks in the previous field of the same type ($F_{N-2}$) and likewise comparing the preceding field ($F_{N-1}$) and the previous field of the same type ($F_{N-3}$). The results of these comparisons are used to detect a degree of motion in the image.

In particular, weighted sums of absolute differences (SWADs) are generated as follows.

Four block matches are performed to produce two SWADS, $SWAD_{AREA}$ and $SWAD_{LOCAL}$. These are:

a 5 h×4 v weighted block match on fields $F_N$ and $F_{N-2}$.

a 5 h×3 v weighted block match on fields $F_{N-1}$ and $F_{N-3}$.

a 1 h×1 v weighted block match on fields $F_{N-1}$ and $F_{N-3}$.

a 1 h×2 v weighted block match on fields $F_N$ and $F_{N-2}$.

Weighted block matches sum weighted absolute differences between coincident pixels, SWAD.

$$SWAD = \sum_{dx=-2}^{2} \sum_{dy=-2,0,2} \sum_{RGB/YCbCr} w(dx, dy)|F_{N-1}(dx, dy) - F_{N-3}(dx, dy)|$$

where $F_{N-1}(dx,dy)$ is the value at the frame-relative position dx, dy to the current pixel. Typical values for the weight w are:

| | | |
|---|---|---|
| 5h×4v block: [ | 12/1024 23/1024 28/1024 23/1024 12/1024 | |
| | 32/1024 62/1024 77/1024 62/1024 32/1024 | |
| | 32/1024 62/1024 77/1024 62/1024 32/1024 | |
| | 12/1024 23/1024 28/1024 23/1024 12/1024 | ] |
| 5h×3v block: [ | 20/1024 39/1024 48/1024 39/1024 20/1024 | |
| | 48/1024 94/1024 117/1024 94/1024 48/1024 | |
| | 20/1024 39/1024 48/1024 39/1024 20/1024 | ] |
| 1h×2v block: [ | 128/256 | |
| | 128/256 | ] |
| 1h×1v block: [ | 255/256 | ] - effectively no weighting. |

Summing the First Two SWADs Gives an Area-Based Block Match, $SWAD_{AREA}$

Summing the Latter Two SWADs Gives a Localised Block Match, $SWAD_{LOCAL}$

All three colour components contribute to the SWADs in the same manner. The system need only maintain a SAD of the three components for each pixel, which is then weighted and combined with the values from the other pixels in the block. This means that this aspect of the process requires only 5 line stores of about 10 bpp (bits per pixel).

Optionally, the high frequency checker 610 is arranged to detect high frequencies in the input fields. The algorithm is based on the following principle. If interleaving the two source fields produces a lot of high frequency energy, then it is appropriate to try to make sure that the inputs are reasonably static. Only static video can produce reliable high frequencies; highly aliased motion can produce high frequencies, but this is not a desirable situation for inter-field interpolation. If motion is present, then high frequencies may be produced where the fields are incorrectly interleaved.

Figure 10:
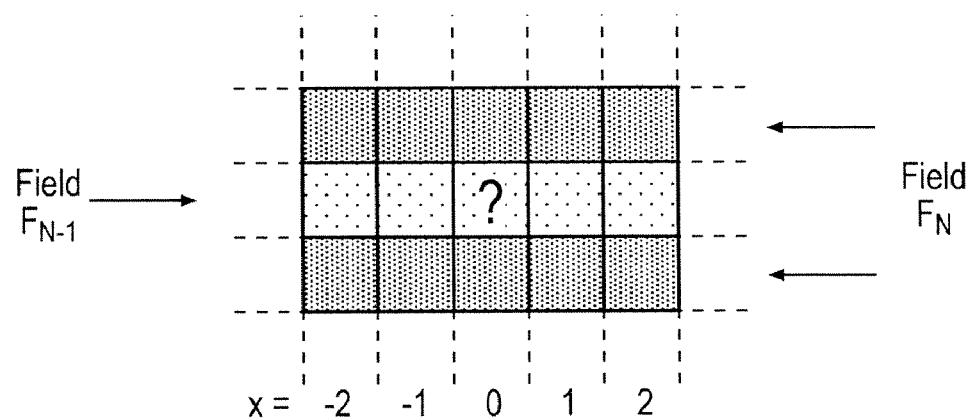
FIG. 10 schematically illustrates a high frequency check operation.

Referring to FIG. 10, the high frequency checker uses the lines above and below the currently interpolated pixel from the current field $F_N$ and the line from the preceding field $F_{N-1}$ that corresponds to the missing line. The HFC may be considered as a 5×3 pixel neighbourhood check.

Let $HFC_{thresh1}$ and $HFC_{thresh2}$ be two programmable constants, with the former greater than the latter.

Set a flag: exceededHighEnergy=false

Over each component (or a subset of them) (RGB/YPbPr)—where YPbPr indicates the colour space in a high definition system, in a similar way to YCbCr in a standard definition system:

Set energy=0

For the pixels having a horizontal position x=−2, −1, 0, 1, 2 (relative to the current pixel), let the interleaved ($F_{N-1}$) field value be $v_0$, and the current field value of the line above and below be $v_{-1}$ and $v_1$, then:

if $v_0$<min($v_1,v_{-1}$), set diff= min($v_1,v_{-1}$)−v0
else if v0>max(v1,v−1), set diff= v0 − max(v1,v−1)
else set diff=0
If (diff>$HFC_{thresh1}$), set energy = energy + ($HFC_{thresh1}$ − $HFC_{thresh2}$)*weighting[x]
else if (diff> $HFC_{thresh2}$), set energy = energy + (diff− $HFC_{thresh2}$)*weighting[x]
If energy > $HFC_{allowance}$, set flag exceededHighEnergy=true
This ends the processing carried out over each component.

Subsequently, if exceededHighEnergy=true, increase $SWAD_{AREA}$ by a programmable constant value, $HFC_{penalty}$.

The increase in $SWAD_{AREA}$ will tend to act against the use of the motion adaptive pixel at that output position.

The mixer 620 operates according to the criteria $SWAD_{AREA}$ and $SWAD_{LOCAL}$ and also various thresholds $thresh_{1,2, etc}$.

If SWAD$_{LOCAL}$ > thresh$_1$, use only spatially interpolated field, F$_{N'}$.
Else if SWAD$_{AREA}$ > thresh$_2$, use only spatially interpolated field, F$_{N'}$.
Else if SWAD$_{AREA}$ < thresh$_3$, use only field F$_{N-1}$
Else mix field F$_{N-1}$ and F$_{N'}$:
    let α =(thresh$_2$–SWAD$_{AREA}$)/(thresh$_2$–thresh$_3$)

The resulting pixel value=αF$_{N-1}$+(1–α) F$_{N'}$. In other words, α represents pixel motion and determines contributions from the intra and inter-field interpolators.

Whilst only F$_{N-1}$ and F$_{N'}$ are mixed in the above equation, it will be appreciated that additional image fields or portions thereof may be mixed with F$_{N-1}$ and F$_{N'}$ at a given pixel position, for example the unfiltered lines of F$_N$ for alternate lines of the image, or earlier image field F$_{N-3}$ if there is substantially no motion at all.

It has been recognised that the presence of noise in successive fields of the video input can generate 'motion noise', that is, apparent motion in a pixel due to the changes induced by the addition of noise.

However, the converse is also possible; namely that the addition of noise can counteract genuine changes in pixel values, resulting in a pixel apparently remaining substantially static when in fact it should be classified as in motion.

Such spurious static pixels may also occur when noise affected pixel values lie very close to a classification threshold.

Clearly, if a pixel in a field F$_N$ is identified as static but is in fact in motion, then a high value of α (associated with a static pixel) can result in the actually mismatched data from previous field F$_{N-1}$ being predominant in the mixed processed pixel, as can be seen in the equations disclosed above. This can blur the processed image or introduce visible artefacts.

Figure 11:
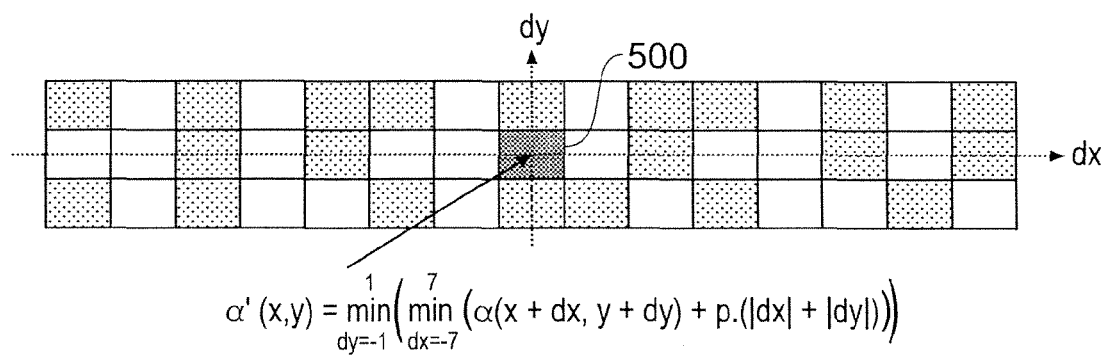
FIG. 11 schematically shows a pixel attribute adjustment.

Referring now to FIG. 11, the α value associated with each pixel is changed before mixing to take the smallest α value found within the test region (i.e. that value representing the most inter-image motion), plus a variable offset dependent upon the distance between the current pixel and the pixel associated with the smallest α value.

Specifically, $$\alpha'(x, y) = \min_{dy=-1}^{1} \left( \min_{dx=-7}^{1} (\alpha(x + dx, y + dy) + p \cdot (|dx| + |dy|)) \right)$$

for a typical test region of ±7 h and ±1 v pixels centred on the pixel to be changed. The value of p controls the scale of the variable offset. This process is referred to hereafter as the first process. The value p can of course be zero.

Figure 12:
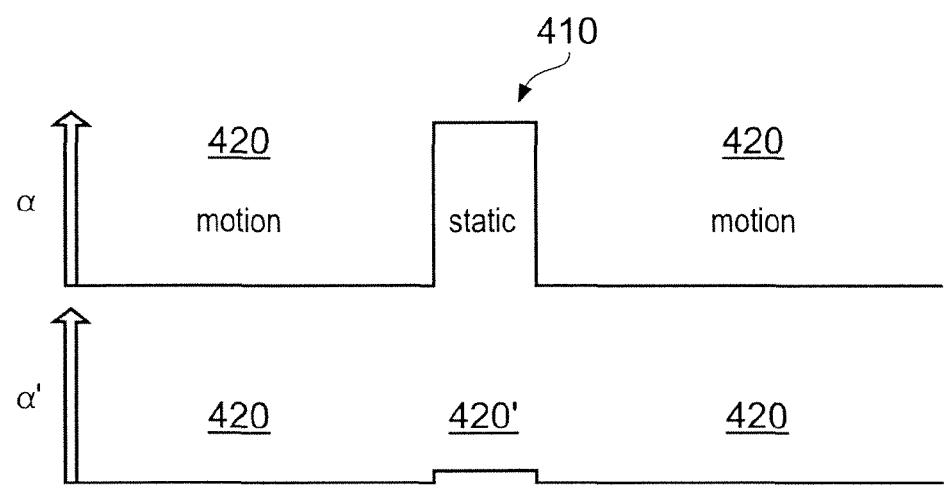
FIG. 12 schematically shows an adjusted pixel attribute.

Referring to FIG. 12, for a small region of one or more static pixels 410 surrounded by motion pixels 420, the effect of this first process is that motion areas 420 (indicated by low α values) expand to remove small areas of static within and around them, over-writing the α values of static areas to form new motion areas 420'.

Figure 13A:
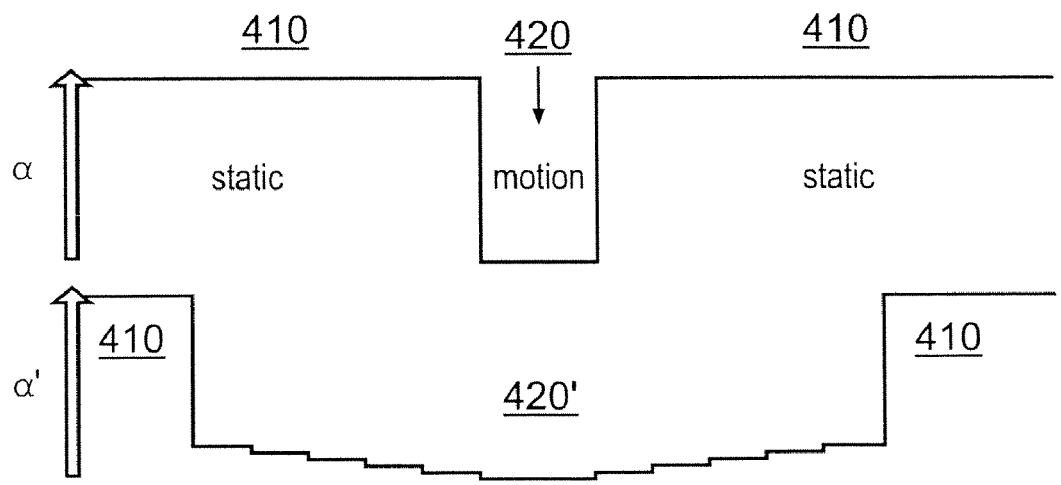
FIGS. 13A-B schematically show adjusted pixel attributes.
Figure 13B:
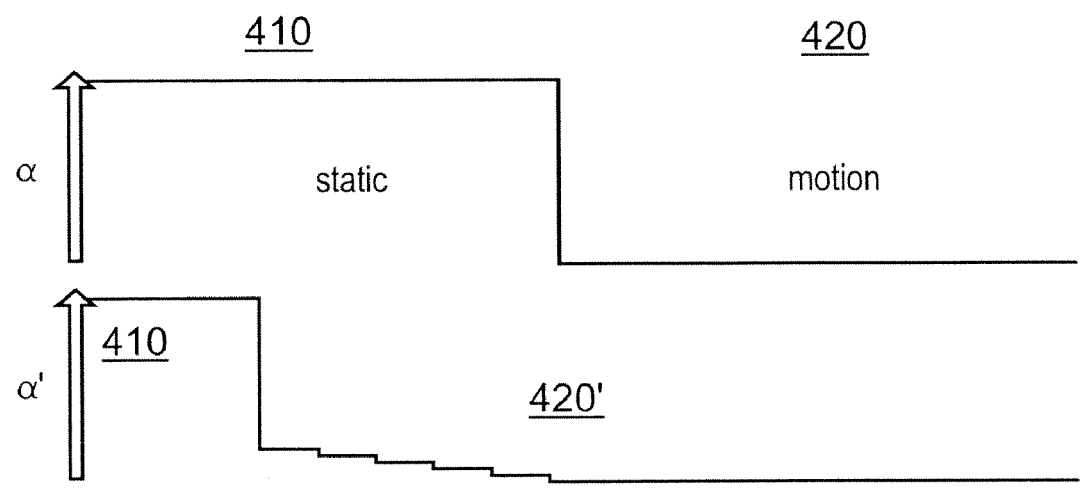

However, referring now also to FIGS. 13A and 13B, whilst this effect mitigates against noise-induced static regions 410, it exacerbates the presence of noise-induced motion regions 420, as these are expanded into predominantly static areas 410. FIG. 13A shows the values of α and α' surrounding a motion noise pixel, in which the motion pixel region 420' expands to overwrite some of the surrounding static pixel α values, whilst FIG. 13B similarly shows the values of α and α' for a static region 410 adjacent to a region of motion 420, in which the motion region 420' expands to encroach upon the static region 410 in a similar manner.

Figure 14:
FIG. 14 is an example image illustrating a conversion error.

An example of an expanded region of motion noise 502 affecting interlace to progressive scan conversion can be seen in FIG. 14. In this figure, noise added to a pixel at the centre of the outlined region 502 caused it to be categorised as moving, and this was then expanded as described above to form a region of sufficient size that its affect (namely the use of interpolation rather than interlacing) is visible in the blurring of the steps.

Figure 15:
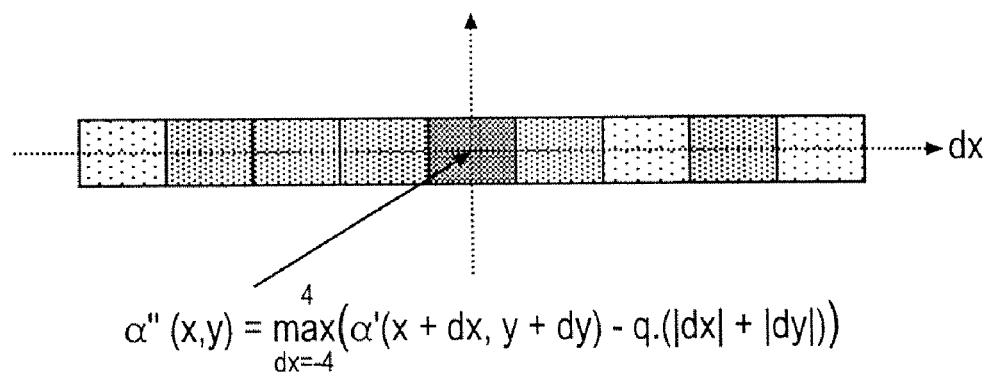
FIG. 15 schematically shows a pixel attribute adjustment.

Referring now to FIG. 15, in an embodiment of the present invention a reverse, or second, process is applied to mitigate this side-effect, over a smaller area of pixels; namely, applying the highest remaining alpha value in a test region (i.e. the most static value, or with the least inter-image motion), minus a distance-based offset, to the selected pixel.

Specifically, $$\alpha''(x, y) = \max_{dy=-4}^{4} (\alpha'(x + dx, y + dy) - q \cdot (|dx| + |dy|))$$

for a typical test region of ±4h pixels centred on the pixel to be changed. The value of q controls the scale of the variable offset.

Figure 16A:
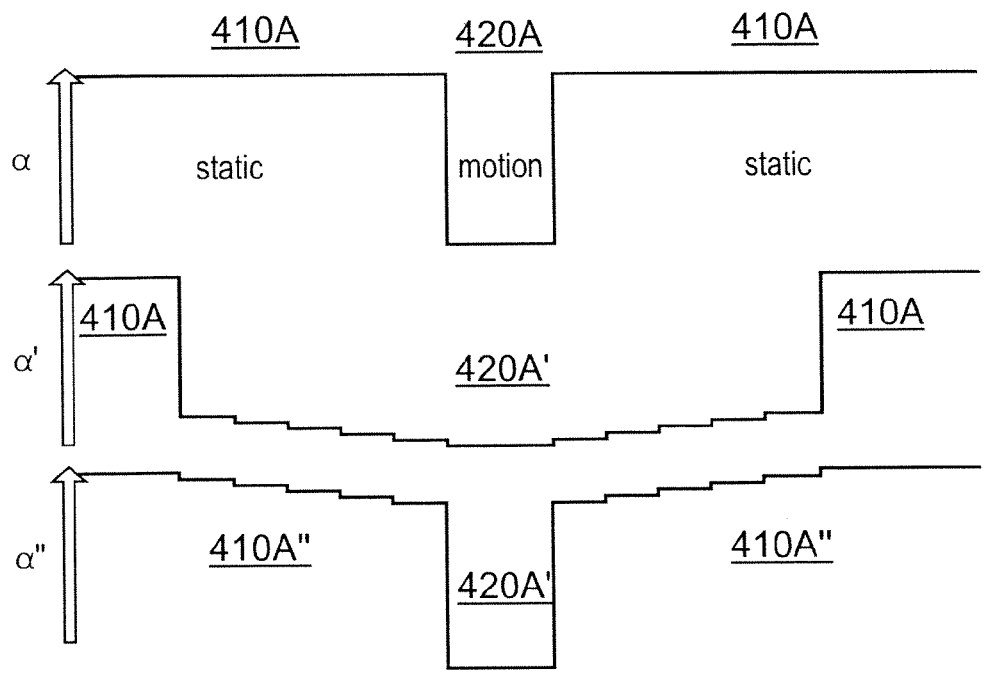
FIGS. 16A-C schematically show adjusted pixel attributes.
Figure 16B:
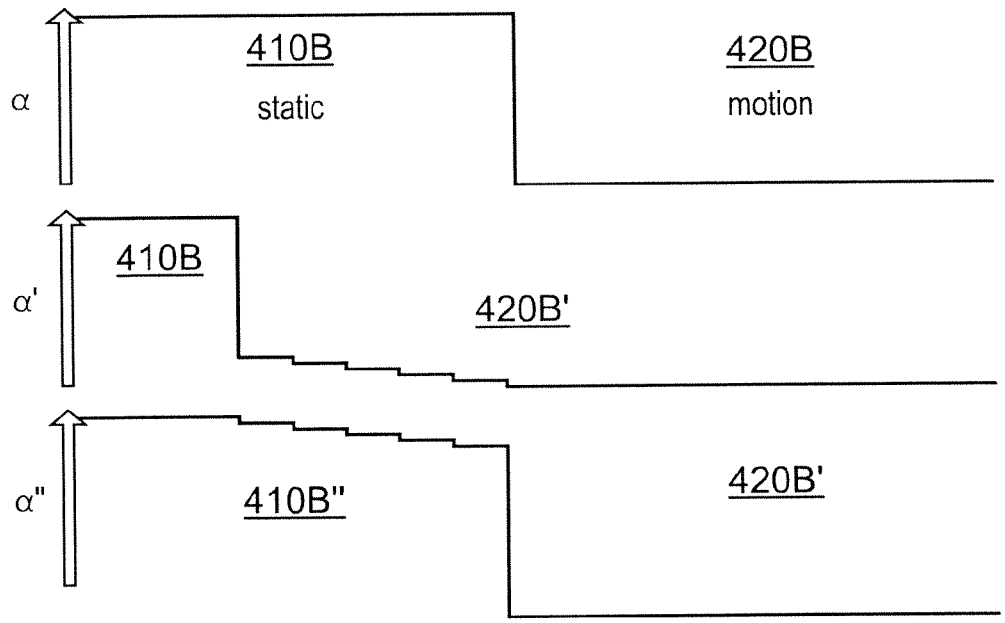
Figure 16C:
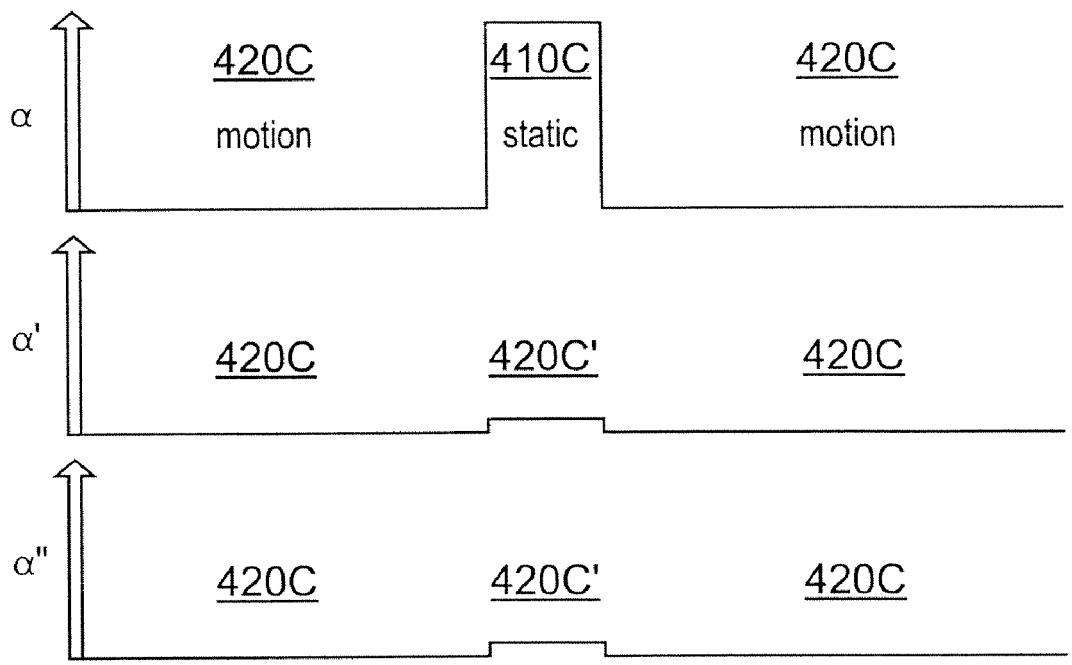

Referring to FIGS. 16A to 16C, values of α, α' and α" are shown in succession. In FIG. 16A, a motion region (e.g. one pixel, due to noise) 420A is shown within static regions 410A, and it can be seen that a motion region grows 420A' (α to α') following the first process, but then shrinks 420A" (α' to α") following the second process in which the static regions 410A' are expanded back. Likewise in FIG. 16B, when a motion region 420B is adjacent to a static region 410B, the edge of the motion region grows 420B' (α to α') following the first process, but then shrinks 420B" (α' to α") following the second process in which the static region 410B' expands back. However, in FIG. 16C, in which a small static region 410C is surrounded by motion regions 420C, when the motion regions grow 420C' and completely remove the small region of static pixels 410C (α to α') following the first process, the motion regions do not shrink upon application of the second process (α' to α") because there are no static pixels remaining with high alpha values from which to increase α" values in the second process.

Figure 17:
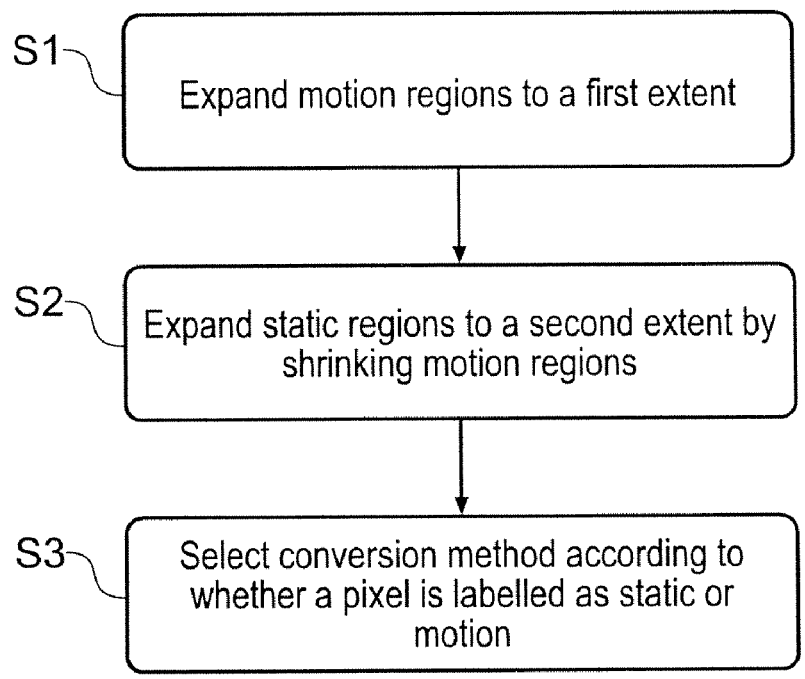
FIG. 17 is a flow diagram of a method of image processing.

Thus the combined effect of the first and second processes can be summarised as follows, with reference to the flow diagram of FIG. 17:

In a first step s1, the motion regions are expanded to a first extent;

In a second step s2, the static regions are expanded to a second extent (equivalent to shrinking the motion regions);

the first extent being such that small static regions within motion regions are completely removed by the motion expansion and so are not able to recover during the subsequent static expansion, whilst other static regions recover to approximately their original state.

This therefore removes most noise induced static pixels that occur in isolation or small regions, whilst not greatly affecting α-based motion categorisation elsewhere.

Then, in a third step s3, one can interleave image fields for static pixels, whilst using spatial interpolation for motion pixels.

Optionally, the second extent is smaller in magnitude than the first extent.

In an embodiment of the present invention, α values derived for the preceding frame are used for the first and second processes when searching for the minimum or maximum nearby α value, as applicable.

This reduces the processing delays inherent in, for example, determining the α values of the next line in the image (+1 v).

It will be appreciated that the above described techniques may be applied to a whole image or a part thereof, a part being either a contiguous or non-contiguous selection of pixels within the image.

It will be appreciated by a person skilled in the art that the reference to the mixing of fields $F_{N'}$ and $F_{N-1}$ is one of several potential mixing options available for interlacing images in an image sequence. Generalising $F_{N'}$ to $F_{Sx}$ and $F_{N-1}$ to $F_M$, a selection of interpolation modes may be defined as:

---
Mode 1: Zero field system delay (as in the description)

$F_{Sx}$ = interpolated field associated with field $F_{N'}$
$F_M$ = field $F_{N-1}$
Mode 2: One field system delay, backward mixing $F_{Sx}$ = interpolated field associated with field $F_{N-1}$
$F_M$ = field $F_{N-2}$
Mode 3: One field system delay, forward mixing $F_{Sx}$ = interpolated field associated with field $F_{N-1}$
$F_M$ = field $F_{N'}$.
---

Consequently, for example, the mixed pixel value would equal $\alpha F_M + (1-\alpha) F_{Sx}$.

The motion adaptive interpolator 110 shown in FIG. 9*a* may be adapted to carry out various of the embodiments of the method described above.

In general, it will be appreciated that the invention can be implemented in programmable or semi-programmable hardware apparatus operating under the control of appropriate software. This could be a general purpose computer or arrangements such as an ASIC (application specific integrated circuit) or an FPGA (field programmable gate array), or the motion adaptive interpolator 110. The software could be supplied on a data carrier or storage medium such as a disk or solid state memory, or via a transmission medium such as a network or internet connection, or via combinations of these.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

APPENDIX

Some example Parameters:

|  | YPbPr setting | RGB setting |
|---|---|---|
| HFC weighting | [2 4 5 4 2] | [2 4 5 4 2] |
| $HFC_{thresh1}$ | 40 | 40 |
| $HFC_{thresh2}$ | 8 | 8 |
| $HFC_{allowance}$ | 218 | 128 |
| $HFC_{penalty}$ | 10 | 25 |
| thresh1 | 60 | 120 |
| thresh2 | 20 | 50 |
| thresh3 | 25 | 60 |
| p | 24/256 | 24/256 |
| q | 8/256 | 8/256 |

What is claimed is:

1. A method of image processing for conversion of an image in a sequence of images, comprising the steps of:
    associating each respective pixel of an image or a part of the image with a respective motion value indicative of a degree of inter-image motion for that pixel;
    adjusting the motion value of each respective pixel based upon the motion value of a single first pixel found within a first region of a first predetermined size substantially centred upon each said respective pixel, said single first pixel being that single pixel whose associated motion value is indicative of a greatest motion of any pixel in the first region; and then
    adjusting the motion value of each respective pixel based upon the motion value of a single secondary pixel that lies within a second region of a second predetermined size substantially centred upon each said respective pixel, said single secondary pixel being that single pixel whose associated motion value is indicative of a least motion of any pixel in the second region, wherein the first region is different from the second region; and then
    selecting contributions from a first conversion process and/or a second conversion process for each respective pixel dependant upon its respective associated adjusted motion value.

2. A method according to claim 1, in which adjusting the motion value of said respective pixel centred in a first region comprises the step of:
    adjusting the motion values of pixels within the first region, for the purpose of selecting the single first pixel by detecting the greatest motion within the first region, by a further value dependent upon an actual distance between the respective pixel centred in the first region and each other pixel in the first region; and
    applying that adjusted value in respect of the single first pixel as a new motion value of said respective pixel centred in the first region.

3. A method according to claim 1, in which adjusting the motion value of said respective pixel centred in a second region comprises the steps of:
    adjusting the motion values of pixels within the second region, for the purpose of selecting the single secondary pixel by detecting the least motion within the second region, by a further value dependent upon an actual distance between the respective pixel centred in the second region and each other pixel in the second region; and
    applying that adjusted value in respect of the single secondary pixel as a new motion value of said respective pixel centred in the second region.

4. A method according to claim 1, in which the first region of the first predetermined size is of greater size than the second region of the second predetermined size.

5. An image processing apparatus for conversion of an image in a sequence of images, the apparatus comprising:
    a motion detector to associate each respective pixel of an image or a part of the image with a respective motion value indicative of a degree of inter-image motion for that pixel;
    a first motion value adjuster operable to adjust the motion value of each respective pixel based upon the motion value of a single first pixel found within a first region of a first predetermined size substantially centred upon each said respective pixel, said single first pixel being that pixel whose associated motion value is indicative of a greatest motion of any pixel in the first region;
    a second motion value adjuster operable, after the first motion value adjuster, to adjust the motion value of each respective pixel based upon the motion value of a single secondary pixel that lies within a second region of a second predetermined size substantially centred upon each said respective pixel, said single secondary pixel being that pixel whose associated motion value is indicative of the least motion of any pixel in the second region, wherein the first region is different from the second region; and a conversion selector operable to select contributions from a first conversion process and/or a second conversion process for each respective pixel dependant upon its respective associated adjusted motion value.

6. The image processing apparatus according to claim 5, in which the first motion value adjuster is operable to:

adjust the motion values of pixels within the first region, for the purpose of selecting the single first pixel by detecting the greatest motion within the first region, by a further value dependent upon an actual distance between the said respective pixel centred in the first region and each other pixel in the first region; and apply that adjusted value in respect of the single first pixel as a new motion value of said respective pixel centred in the first region.

7. The image processing apparatus according to claim 5, in which the second motion value adjuster is operable to:

adjust the motion values of pixels within the second region, for the purpose of selecting the secondary pixel by detecting the greatest motion within the first region, by a further value dependent upon an actual distance between the said respective pixel centred in the second region and each other pixel in the second region; and apply that adjusted value in respect of the single secondary pixel as a new motion value of said respective pixel centred in the second region.

8. The image processing apparatus according to claim 5, in which the first region of the first predetermined size is of greater size than the second region of the second predetermined size.

9. A non-transitory computer readable medium encoded with instructions, which when executed by a computer causes the computer to carry out the method of claim 1.

* * * * *